United States Patent [19]

Berdahl

[11] 4,063,092
[45] Dec. 13, 1977

[54] SELECTIVE IMAGE AREA CONTROL OF X-RAY FILM EXPOSURE DENSITY

[75] Inventor: C. Martin Berdahl, Sierra Madre, Calif.

[73] Assignee: The United States of America as represented by the Administrator of the National Aeronautics and Space Administration, Washington, D.C.

[21] Appl. No.: 675,328

[22] Filed: Apr. 9, 1976

[51] Int. Cl.² ............................................ G03B 41/16
[52] U.S. Cl. ................................ 250/322; 250/416 TV
[58] Field of Search ................ 250/322, 413, 416 TV, 250/402, 355

[56] References Cited

U.S. PATENT DOCUMENTS

| 3,126,480 | 3/1964 | Bouwers | 250/322 |
| 3,439,114 | 4/1969 | Taylor | 250/322 |
| 3,546,461 | 12/1970 | Craig | 250/322 |

OTHER PUBLICATIONS

Hewlett-Packard Journal, "An Automatic Exposure Control for Lab-Bench X-Ray Camera", Brewster, vol. 25, No. 11, July 1974, pp. 20–24.

Primary Examiner—Saxfield Chatmon, Jr.
Assistant Examiner—B. C. Anderson
Attorney, Agent, or Firm—Monte F. Mott; Wilfred Grifka; John R. Manning

[57] ABSTRACT

A system for accurately determining the exposure density required for x-ray photography of a particular area of interest is provided. The light received from an x-ray image intensifier is applied to a beam splitting mirror which divides the light between a motion picture film camera and a television film camera. Between the beam splitter and the motion picture film camera, there is positioned another light beam splitter to direct some of the light at a mask having an opening which encloses only the image area of interest. Behind that opening there is positioned a photomultiplier intensity sensor for determining the exposure required and varying x-ray beam intensity accordingly.

3 Claims, 1 Drawing Figure

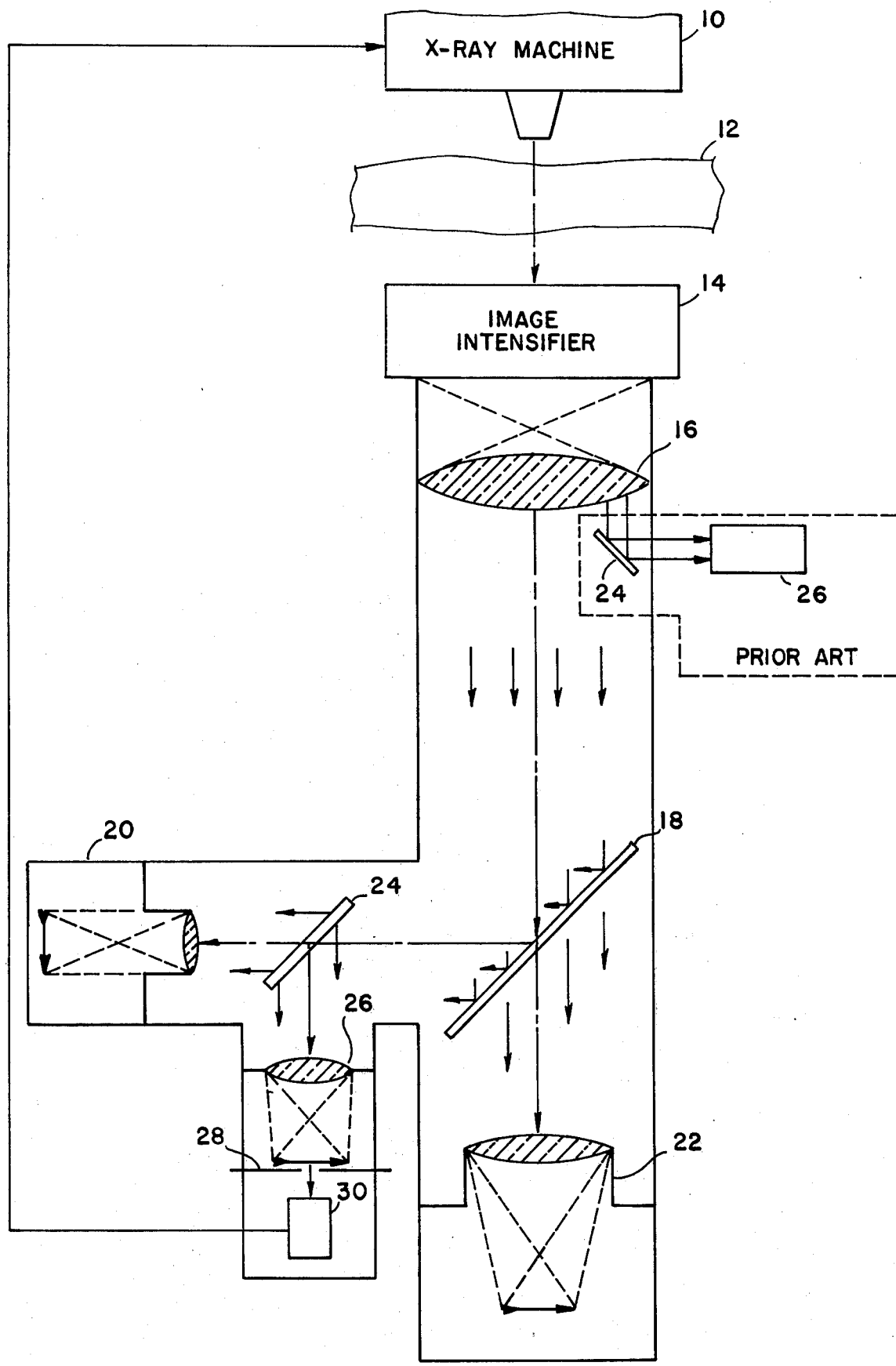

SELECTIVE IMAGE AREA CONTROL OF X-RAY FILM EXPOSURE DENSITY

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to an improved system for determining the x-ray exposure required for photography.

Medical diagnosis of internal human tissue is frequently performed by the use of motion picture x-ray techniques, particularly when the tissue of interest, such as, for example, the beating heart, is in motion. The technique involves use of an x-ray tube aimed at the patient, a fluorescent screen disposed on the opposite side of the patient, an image intensifier which views the fluorescent screen and increases the brightness of the image, and a motion picture film camera which records the moving image. A television system is often used to provide a display as the x-ray image is panned, so that the particular site of interest can be properly positioned while the motion picture film is being exposed.

Proper exposure of the motion picture film requires accurate information with respect to light content of the image which is to be photographed. This is presently obtained by extracting and directing at a photomultiplier exposure sensing system, a small sample of a portion of the light contained in a collimated beam formed from the visible image produced by the image intensifier. Since any part of the collimated beam is composed of light from all parts of the image, what is sensed is only an average sample which is representative of the total amount of light in the entire image. Since the image of the subject contains areas of both high and low x-ray absorptivity, it is difficult to determine accurately from a sample of the entire image the optimum exposure required for the particular body portion of interest which is only a part of that total image. Since, with the presently used system, the operator has no control over the location of the light sample taken, the result is often an unsatisfactory exposure.

The patient must then be subjected again to x-radiation in order to obtain a better picture. Since it is desirable to minimize exposure of the patient to x-radiation, it is advantageous and less potentially harmful to the patient to determine initially, the optimum exposure required for the particular body portion of interest.

OBJECTS AND SUMMARY OF THE INVENTION

It is an object of this invention to provide an arrangement fo enabling the optimum exposure required for photographing a particular area of interest to be obtained the first time x-ray radiation takes place.

Another object of this invention is to provide a novel and improved arrangement for enabling optimum x-ray exposure required for a particular portion of a body of interest, using motion pictures.

The foregong and other objects of the invention may be achieved in a system in which the light output of an x-ray image intensifier is passed through a collimating lens and then onto a beam splitting mirror which passes a portion of the light to a television camera and a portion of the light to a film camera. The television camera is used to produce an image from which it can be determined whether the part of the body of interest is being x-rayed or whether the person being x-rayed or the x-ray machine must be relocated to produce an image of the portion of the body of interest. In accordance with this invention, there is interposed between the film camera and the beam splitter, a second smaller beam splitter, which permits some light to pass therethrough to be imaged on the lens of the film camera, and which also directs a portion of the received light onto an imaging lens. The imaging lens focuses the image on a mask. The mask has an aperture whose diameter is selected to define the specific area of interest of the region of the body being x-rayed. The light passing through the image mask falls on a photomultiplier, which is used to sense the intensity of the light received whereby a determination of the correct exposure required for properly photographing the desired portion of the body can be achieved.

The novel features of the invention are set forth with particularity in the appended claims. The invention will best be understood from the following description when read in conjunction with the accompanying drawing.

DESCRIPTION OF THE PREFERRED EMBODIMENTS

The drawing represents a schematic diagram which illustrates both the prior art system presently being used, as well as an embodiment of this invention.

An x-ray machine 10 projects x-rays at a patient 12. X-rays passing through that patient impinge upon an image intensifier 14. The output of the image intensifier is collimated by a lens 16 disposed on the opposite side thereof. The collimated light falls upon a beam splitting mirror 18 which splits the light and directs one portion at a motion picture camera 20, and permits a second portion to pass therethrough to be directed at a television camera 22.

In accordance with the prior art, a small mirror 24 is positioned in the collimated light beam, and intercepts and diverts a portion of the light for perception by the photomultiplier exposure sensing system 26. As previously indicated, since any part of the collimated beam is composed of light from all parts of the image, what is sensed is only an average sample which is representative of the total amount of light in the entire image. Since the image of the subject contains areas of high and low x-ray absorptivity, it is difficult to determine accurately from this sample, the optimum exposure required for a particular body portion of interest, which is only a part of that total image. Also, since the operator has no control over the location of the light sample taken, the result is often an unsatisfactory exposure.

In accordance with this invention, the light reflected from the beam splitting mirror 18 is directed at another beam splitting mirror 24. The light passing therethrough will still impinge upon the film camera 20 to be photographed. The light redirected by the mirror 24 is directed at an imaging lens 26, which in turn directs it at a mask 28, located at the image position. The mask will have a central aperture, (or an adjustable diaphragm) which will enclose the central portion of an area of interest. Accordingly, a photomultiplier 30, which is used for intensity sensing, and for controlling the x-ray beam intensity, for example, is positioned to receive the light passing through the aperture of the mask. It therefore senses only the light included in the image which exists in the predetermined area of interest. Accordingly, it will indicate more accurately, the quantity of this light and can thus provide an output signal which is applied to the x-ray machine 10 to establish the x-ray beam intensity provided by the x-ray machine 10. Thereby an accurate exposure of the film for the area of interest is achieved. The camera lens aperture may be left wide open so that the patient will have the minimum of x-ray exposure for the part of the body being photographed. This occurs because the x-ray beam intensity is altered for exposure requirements, rather than altering the film camera controls.

There has accordingly been described and shown a novel and useful arrangement for accurately determining the exposure required for photographing an area of interest in a subject being x-rayed, the first time, and with a minimum of x-ray exposure for the patient.

I claim:

1. A system of the type wherein the x-rays passing through a patient are applied to an image intensifier which generates a light image in response thereto, the light image is collimated and then directed at a first beam splitting means which directs some of the light at a motion picture camera and passes the remainder of the light to a television camera, the improvement comprising a mask having an aperture sized to encompass the central area of interest of the image being intensified by said image intensifier, a light intensity sensing means responsive to light impinging thereon for controlling the x-ray intensity required for determining correct motion picture camera exposure, said light intensity sensing means being positioned at one side of said aperture mask to receive an area of light passing therethrough corresponding to the area of said aperture, a second beam splitting means positioned between said first beam splitting means and said motion picture camera for receiving light directed at said motion picture camera by said first beam splitting means and directing a portion thereof at said apertured mask to pass therethrough and impinge upon said light intensity sensing means, and an imaging lens between said second beam splitter and said apertured mask for focusing the image defined by the light, directed by said second beam splitting means, on said apertured mask.

2. A method of improving the determination of film exposure required for photographing a particular area of interest of an x-ray image in a system wherein x-rays passing through a subject are applied to an image intensifier for being converted into a light image, collimating said light image, directing said light image at a film camera and at a television camera, intercepting some of the light being directed to said motion picture camera and directing it at a light intensity sensing means, blocking all of the light directed at said light intensity sensing means except that coming from the area of interest, whereupon said light sensing means provides an output signal representative of the light from the area of interest, and controlling the intensity of x-rays passing through said subject responsive to said output signal.

3. A system for determining film exposure density for a specific image area from the light image produced, in response to x-rays which have passed through a body, by an image intensifier which is then collimated, comprising means for directing some of said collimated light at a motion picture camera and at a television camera, light intensity sensing means for controlling the intensity of said x-rays responsive to the light falling on said light sensing means and thereby said motion picture camera exposure, beam splitting means for directing a portion of the light directed at said motion picture camera, at said light intensity sensing means, masking means for permitting only the light from the image area of interest to be received by said light intensity sensing means, and lens means positioned between said beam splitting means and said masking means for focusing a light image on said masking means.

* * * * *